Figure 1:
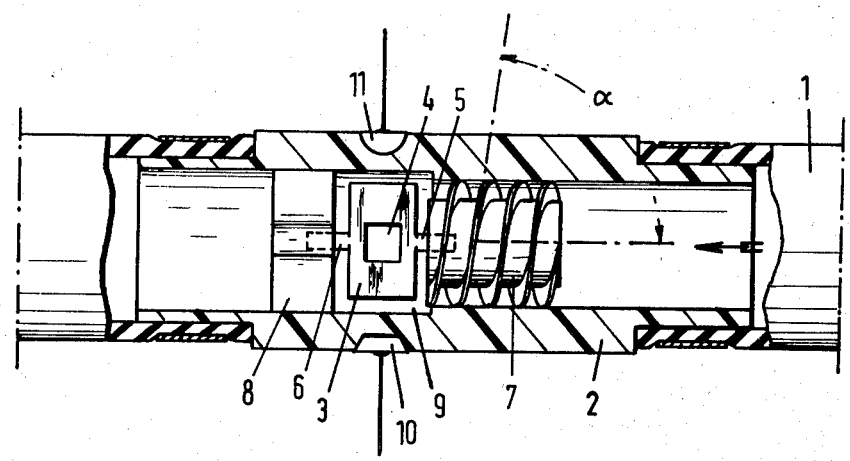

United States Patent [19]

Peters

[11] 4,395,919
[45] Aug. 2, 1983

[54] FLOW RATE METER

[75] Inventor: Paulus J. Peters, Wychen, Netherlands

[73] Assignee: Nevamo Inc., Panama City, Panama

[21] Appl. No.: 218,079

[22] Filed: Dec. 19, 1980

[30] Foreign Application Priority Data

Dec. 21, 1979 [NL] Netherlands ............ 7909271
Jun. 10, 1980 [NL] Netherlands ............ 8003374

[51] Int. Cl.$^3$ ............................................. G01F 1/10
[52] U.S. Cl. .............................. 73/861.77; 73/861.89; 73/861.92
[58] Field of Search ........... 73/861.33, 861.35, 861.83, 73/861.89, 861.93, 861.92, 861.77

[56] References Cited

U.S. PATENT DOCUMENTS

| 2,146,827 | 2/1939 | Kruspi | 73/861.33 |
| 3,036,460 | 5/1962 | White et al. | |
| 3,144,768 | 8/1964 | Gehre | |
| 3,153,341 | 10/1964 | Spalding | 73/861.83 |
| 3,240,063 | 3/1966 | Brueckner | 73/861.83 |
| 3,307,396 | 3/1967 | Griffo | |
| 3,680,378 | 8/1972 | Aurilio et al. | 73/861.83 |
| 3,898,883 | 8/1975 | Kozak | 73/861.33 |
| 3,979,957 | 9/1976 | Rutgerson | 73/861.92 |
| 4,047,433 | 9/1977 | Dabanian | 73/861.33 |

FOREIGN PATENT DOCUMENTS

| 2546153 | 4/1977 | Fed. Rep. of Germany . |
| 1193625 | 4/1959 | France . |
| 1389717 | 11/1965 | France . |
| 2081224 | 12/1971 | France . |
| 2106452 | 5/1972 | France . |
| 561413 | 4/1975 | Switzerland . |
| 1138373 | 1/1969 | United Kingdom . |
| 2024628 | 1/1980 | United Kingdom . |

Primary Examiner—Herbert Goldstein
Attorney, Agent, or Firm—Fleit, Jacobson & Cohn

[57] ABSTRACT

A fluid flow rate meter, in particular a liquid flow rate meter, such as a fuel consumption meter for a motor vehicle. The meter comprises a housing to be mounted in a conduit. The housing has an axial passageway, and a liquid directing member in the form of an insert fills up the passage opening, which insert has at least one helical channel along its circumference. A rotor has a central shaft journalled with limited axial clearance on the downstream side of said insert in a cavity provided for the purpose in the downstream end face of said insert, and in a similar cavity in a counter-bearing. The counter-bearing comprises a central portion containing said cavity and is connected through radial sheet members to the wall of said passageway. A device is provided for sensing rotor revolutions and converting these into a signal representation of the fluid flow rate.

14 Claims, 4 Drawing Figures

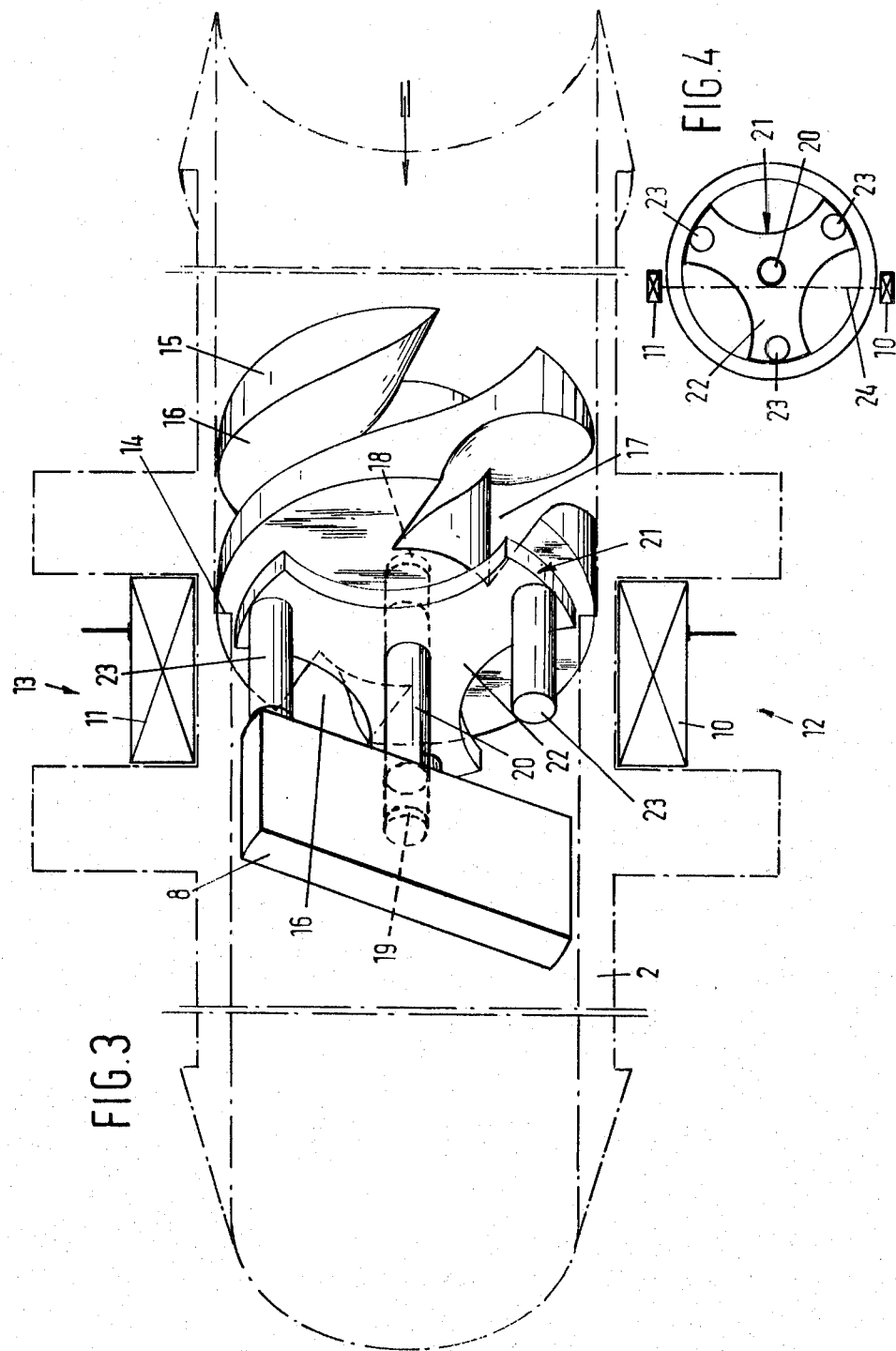

FLOW RATE METER

This invention relates to a fluid flow rate meter, in particular a liquid flow rate meter, such as a fuel consumption meter for a motor vehicle, but also suitable for other liquid measurements, in which an accurate indication of the instantanious rate of flow and/or of the total rate of flow for a pre-determined period is important.

In the field of fluid flow rate meters, many proposals have been made in the patent literature. In liquid flow rate meters employing a rotor journalled in a fluid passageway, which rotor is rotated about its shaft by fluid flowing along it in the axial direction, and in which means are provided for observing the rotor revolutions and converting these into a signal representative of the flow rate, two main systems can be distinguished. Thus there are flow meters for liquid metering devices, such as beverage dispensers, in which equal portions of a relatively large quantity of liquid, such as a soft drink, must be able to flow through the fluid passageway in a given, relatively short period of time. In order not to impede such liquid flow any more than necessary, use is made of a rotor having such a helical configuration that the liquid flowing axially through the entire passage opening impinges upon the rotor at a relatively small angle, for example of 20°. Partly owing to the slippage which under the circumstances is inevitable, there is no question of any linear relationship between the rate of rotation and the rate of liquid flow within a broad range. This, however, is not an objection in beverage dispensers, which only have to deliver a given total quantity in a given short period of time over and over again.

Examples of a basically different system are described in U.S. Pat. Nos. 3,240,063 and 3,922,525. These employ a rotor having vanes extending radially and in planes containing the axis of the rotor, and upstream of the rotor the fluid flow is deflected from its initially axial direction into a helical movement in order that the rotor shaft may be crossed at right angles as much as possible, and accordingly optimum action may be exerted on the rotor vanes. In the flowmeter described in U.S. Pat. No. 3,240,063, the liquid deflection member is designed as an insert which fills the fluid passageway, said insert having helical passages at the circumference, owing to which not only is the liquid flow helically orientated, but in addition the liquid passageway is restricted, thereby creating an acceleration which effects a relatively large number of rotor revolutions per volume of liquid flowing through the device. In combination with sensing means in which rotor revolutions are converted into pulses which in turn are translated into rate of flow values, such an increase in velocity of flow is favourable for accuracy of measurement.

In particular for measuring fuel consumption of vehicle motors, however, it is found that in practice the highly inaccurate vacuum measurement in the inlet stub of the engine is still being applied quite frequently, from which, indirectly, fuel consumption is derived. A possible reason for this is that it is difficult to realize a meter of the type described in U.S. Pat. No. 3,240,063 which is cheap, has a high reliability, and moreover gives accurate indications within a wide range. In this connection it must be taken into account that a rotor which must rotate about an axial centre line in an axial liquid current is influenced by the axial thrust of the liquid current in the sense that the rotor is forced against the downstream bearing thereof, owing to which bearing friction is increased, and the speed of the rotor, i.e., the number of revolutions per unit of time, is no longer representative of the amount of liquid passing it. In the meter described in U.S. Pat. No. 3,240,063, this effect is taken into account by using a dual ball bearing for the rotor. Furthermore, in Swiss patent specification No. 474,050 a construction is described in which, for the purpose of preventing axial liquid thrust, a portion of the axial current is returned countercurrently along the outside of the rotor, so that the rotor is radially journalled relatively to liquid vortices maintained in the vicinity of its outer circumference. It might be said that the reason that, up till now, little or no use has been made of the consumption meters described in the patent literature is that these are complicated and hence expensive, and in addition prone to faults, cannot be made in small dimensions and/or no longer give correct indications when there are large variations in flow rate. In particular in the low-speed range, the effect of ball bearing friction will become substantial, and vortices at the outer circumference of the rotor will fail to function.

The present invention provides a flow rate meter which not only, as has been shown by tests, gives excellent satisfaction, but can be made so cheap that it becomes feasible for them to be manufactured in disposable form, which may be important, for example, to ensure sterile conditions in medical infusion apparatus.

Starting from the state of the art as described in U.S. Pat. No. 3,240,063, the present invention provides a fluid flow rate meter comprising a housing to be mounted in a conduit, said housing having an axial passageway, a liquid directing member in the form of an insert filling up the passage opening, said insert having at least one helical channel along its circumference, a rotor journalled on the downstream side of said insert, said rotor having an axis of rotation oriented in the direction of the axis of said passageway, and vane members extending in spaced parallel position to the axis of the rotor and comprising means for sensing rotor revolutions and converting these into a signal representative of the fluid flow rate, characterized in that the rotor has a central shaft whose upstream end is journalled in a cavity provided for the purpose in the downstream end face of said insert, and whose downstream end is journalled in a similar cavity in a counter-bearing, said counter-bearing comprising a central portion containing said cavity and being connected through radial sheet members to the wall of said passageway, the rotor being journalled with limited axial clearance.

Such a flowmeter satisfies a large number of requirements. The counter-bearing can be manufactured together with the housing in one injection moulding step, and with the rotor and the insert, the meter is thus assembled from three parts only, excluding the rotation sensing means. Assembly only requires lowering the rotor into the housing until the downstream shaft end is received in the cavity of the counter-bearing, and subsequently the insert is placed in position in a self-gripping manner and axially abutted by a stop shoulder formed in the housing. During operation, the liquid will move helically in the rotor zone, and impinge against the radially extending sheet members of the counter-bearing, with the major portion of the liquid being guided directly axially in downstream direction, but at the same time so much counter-thrust is caused as to keep the rotor in axially floating condition. When the meter, and hence the rotor, has small dimensions and at least the rotor is made of synthetic plastics material, the mass thereof in the liquid will be very light, and consequently bearing friction becomes negligible too.

Accordingly, the meter according to the present invention may be of such light construction that, made of synthetic plastics materials, with a length of approximately 40 mm, a passageway diameter ranging from 4.5 to 5 mm, a largest rotor diameter of 2.3 mm, an insert having an axial length of 3 mm, a rotor space having an axial length of 3 mm and a downstream counter-bearing of 2 mm, it will weigh no more than 10 g. The meter is therefore so light that it can be mounted in a fuel line, where it can operate without further supports or suspensions. Indeed, the meter is insensitive to vibrations of the engine, and its angular position, too, is utterly unimportant. In this connection it is observed that the rotor only weighs approximately 15 mg, and consequently even less in liquid, so that the position of the overall meter has no effect whatsoever on bearing friction.

Partly on account of these small rotor dimensions and the light weight thereof in liquid, the meter is directly set in motion, even with very slight liquid flows. Practice has shown that even a flow rate as low as 2 liters per hour is correctly measured.

Experiments have shown that the liquid thrust effect on the rotor bearing can be removed within a wide range of flow rates, in a further elaboration of the invention, by providing the insert with two helical circumferential channels, each extending at a steep angle to the axis for approximately 180° and beginning and terminating diametrically opposite each other, the counter-bearing being formed as a flat strip extending transversely through the fluid passageway.

As stated before, it is desirable to measure as large a number of pulses per unit volume of liquid flow as possible. When using a rotation sensing means whose operation is based on the interruption of a light ray, which has the advantage over constructions operating with magnets that rotation of the rotor does not require overcoming magnetic field forces, it is accordingly desirable that as large a number of interruptions may be sensed as possible per motor revolution. Theoretically, this only requires increasing the number of blades of the rotor. In practice it turns out, however, that this introduces inaccuracies, especially, when the overall rotor has small dimensions, partly as a result of light ray deflections in the material of the meter housing and in the liquid flowing through it. In U.S. Pat. No. 4,012,958, it is proposed in this connection to form part of the wall of the housing as a converging lens to focus the light beam transmitted by the source of light, in order that smaller vane portions projecting from the rotor core may be observed.

According to the present invention, the generation of pulses by interrupting a light beam a plurality of times per revolution of the rotor can be achieved in a much simpler manner by having the light beam intersect the rotor axis or cross the rotor axis at a small distance, and to make the rotor hollow in the vicinity of its axis, so that upon rotation of the rotor the parts of the rotor located in radially spaced relationship to the axis thereof will always interrupt the light beam in a foolproof manner.

Thus, according to the invention, the rotor may consist of a flat rectangular body with stub shafts extending on opposite ends thereof and having a central aperture therein for allowing the passage of light.

Having hollow cavities within the rotor body is not entirely free from risks. In fact, any gas bubbles that may be present in the liquid current will be forced by the centrifugal force towards the centre of the passageway, and may become entrapped within the rotor body. The air bubbles cause such a deflection of the light beam that the meter no longer gives accurate indications, or none at all.

In order to minimize the change of such an adherence of air bubbles in the central rotor aperture, according to the invention, the central aperture may be of polygonal shape.

It is also possible, of course, to prevent the entrance of air bubbles into the meter by suitable means, such as a venting device downstream of the meter, but it is cheaper if, in accordance with a feature of the present invention, the hollow space present within the rotor is kept open on the downstream end, so that air bubbles can be carried off in the downstream direction, which practical experiments have shown to be indeed the case.

In a preferred form of the invention, the rotor is provided with a body extending transversely to a central shaft, and from which circumferentially spaced cantilever rod elements extend in the downstream direction in spaced relationship to said shaft.

If, however, the presence of air in the rotor is connected with the fact that, at a given moment, no liquid flows through the meter, the meter must be able to recognize this. According to the invention this is achieved by making the greatest radial dimension of the rotor only slightly smaller than the corresponding size of the fluid passageway, so that in the absence of liquid in the central portion of the passageway the rotor will instantaneously stop as a result of friction in the layer of liquid which will always be present at the wall of the passageway.

This property of the meter according to the invention, in combination with its extremely light rotor weight and the negligible bearing friction at the rotor shaft ensures a high sensitivity, which is necessary for an accurate overall measurement, which latter is only possible if the rotor is set in rotation immediately when liquid flows along it, and is also stopped as soon as the liquid ceases to flow.

According to the invention, use can be made of known per se infrared apparatus, which has the advantage that, in view of the long wave length of the infrared radiation the reflection in materials is relatively small, and accordingly there is a greater range of materials to be selected for the housing.

It has been found that the flow rate meter according to the invention, designed with the specifications given hereinbefore is capable of making accurate and instantaneous measurements with variations in flow rate of between 2 liters and 80 liters per hour, while it has turned out that with rotor speeds of between 50,000 and 60,000 rpm, petrol flow rate measurements with a deviation of less than 1.5% are possible. Furthermore the flow rate meter according to the invention is insensitive to clogging, as any dirt particles which enter the meter do not meet any obstacles in their flow path which would prevent them from being carried off.

In summary it may be stated that, by itself, it is not difficult to make accurate and linear measurements within a pre-determined narrow range of flow rates, but that up until now it has been impossible to make accurate measurements with very large variations in flow rate, unless bulky and complicated apparatus is used. The present invention is the first to provide a flow rate meter of simple and cheap construction which does achieve this object.

Figure 2:
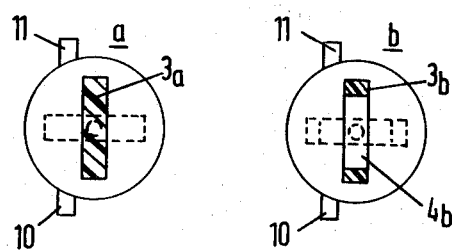

Some embodiments of the fluid flow rate meter according to the present invention will now be described, by way of example, with reference to the accompanying drawings, in which:

FIG. 1 shows a fluid flow rate meter according to the present invention in an embodiment specifically adapted for use in measuring the rate of flow in a fuel line, partly in axial cross-section and partly in side-elevational view;

FIGS. 2a and b are diagrammatic axial elevational views of variant embodiments of the rotor;

FIG. 3 is a cut-away diagrammatic perspective view of a preferred embodiment of the flow rate meter; and FIG. 4 is an elevational end view of the rotor in the preferred form of FIG. 3.

Referring to the drawings, in particular FIG. 1, there is shown a fluid flow rate meter according to the present invention, mounted in a fuel line 1 in which the direction of current is as indicated by the arrow. The meter has a housing 2 of, for example, tranparent synthetic plastics material and with a cylindrical configuration. In housing 2, a rotor 3, in the form of a rectangle with a central aperture 4 and shaft stubs 5 and 6 is journalled between, on the one end, a single-thread or multiple-thread worm 7 and a plate-shaped counter-bearing 8 extending transversely through the central aperture in the housing 2. Shaft stubs 5 and 6 of rotor 3 are accommodated for free rotation in bearing cavities in worm 7 and counter-bearing plate 8.

The petrol current in line 1 is forced by worm 7 into the relatively narrow channel, or plurality of channels if the worm is of the multiple-thread type, defined by the worm windings and housing 2. The outlet of the worm channel at rotor 3 encloses with the rotor shaft an angle α which is as much as possible a right angle, i.e., which is as close to 90° as possible, so that in space 9, in which rotor 3 rotates, the fluid flows as much as possible in a radial direction and impinges upon the rotor virtually at right angles. The plate-shaped counter-bearing 8 forms a resistance in petrol line 1 which provides for some thrust in the petrol current with the favourable result that rotor 3 is not forced with its shaft stub 6 into the associated bearing cavity, but, in an axial sense, floats between the opposed bearing cavities in bearing plate 8 and worm 7.

Housing 2 is provided with diametrically opposed signal sources and receivers, shown diagrammatically, for example, a source of infrared radiation 10 and a receiver 11. A light beam transmitted by transmitter 10 passes through rotor aperture 4 and is periodically interrupted by the rotation of the rotor, so that receiver 11 receives light pulses which further can be converted in known manner into signals representative of the rate of flow of the fluid. The rotor aperture 4 is preferably of rectangular shape, so as to prevent an air bubble from becoming stuck in the opening, which could interfere with the signal transmitted by transmitter 10.

The fluid flow rate meter according to the invention can be mounted in a petrol line 1 in a simple manner, by cutting the petrol line, slipping the tube ends onto the meter housing 2, and fixing these for example by means of clamps, and connecting the necessary electrical and other terminals with calibrated reading or recording instruments. Such a petrol flow rate meter can be made in an inexpensive manner and gives an accurate reading of the instantaneous actual petrol flow to the engine carburettor.

When made of synthetic plastics material, rotor 3 may have a weight in the order of only 15 mg, so that its mass inertia is low, and the rotor will respond immediately to fluctuations in rate of flow, while further as a consequence slippage can hardly occur, and bearing friction is reduced to a minimum. Partly by virtue of the specific mounting of the rotor, the meter is insensitive to vibrations and changes in position.

FIGS. 2a and 2b show variants of rotor configurations and other dispositions of the signal transmitter 10 and receiver 11. In the embodiment of FIG. 2a, the rotor is closed, i.e. without a central opening 4, and the signal transmitter and receiver are arranged eccentrically. FIG. 2b also shows an eccentric arrangement of the signalling means, but owing to the fact that rotor 3b has a large central aperture 4b, four pulses per rotor revolution are produced.

In the embodiment of FIGS. 3 and 4, the flow rate meter also has a housing 2 which can be mounted in a petrol line. Housing 2 can be made in one injection moulding step with external recesses 12 and 13 for accommodating an infrared transmitter 10 and receiver 11 and with a counter-bearing plate 8. Interiorly, housing 2 is formed with a stop shoulder 14 for a liquid director in the form of an insert 15 having two helical circumferential channels 16 and 17, each extending for approximately 180°, and beginning and terminating at diametrically opposed points. The respective terminal ends are off-set relatively to counter-bearing 8 through 90°.

In the facing end fases of insert 15 and counter-bearing 8, respective bearing cavities 18 and 19 are provided to journal the shaft 20 of a rotor 21, the overall length of rotor shaft 20 being inferior to the perpendicular distance between the bottoms of cavities 18 and 19, so that rotor 21 is journaled with axial clearance.

Rotor 21 is equipped with a body 22 extending transversely to shaft 20, and from which cantilever rod elements 23 extend in the downstream direction close to the inner wall of housing 2.

A liquid current coming from the helical channels 16 and 17 will impinge upon these elements 23 virtually at right angles and cause the rotor to rotate for elements 23 to interrupt light beam 24 which (see FIG. 4) is directed closely along rotor shaft 20. Rotor 21 has an open configuration, so that air bubbles are not retained. When the flow of liquid through the flow rate meter is interrupted, the rotor stops immediately.

The assembly of the flow rate meter is effected by inserting rotor 21 until the downstream end of shaft 20 is received in bearing cavity 19, introducing insert 15 up to stop 14, and mounting transmitter 10 and receiver 11 in the recesses 12 and 13 provided for the purpose.

I claim:
1. A fluid flow rate meter comprising:
   a housing to be mounted in a circuit, said housing having an axial passageway;
   a liquid directing member in the form of an insert filling up the passageway opening, said insert having at least one helical channel along its circumference;
   a rotor journalled on the downstream side of said insert, said rotor having an axis of rotation oriented in the direction of the axis of said passageway, and vane members extending in spaced parallel position to the axis of the rotor;

means for sensing rotor revolutions and for converting sensed revolutions into a signal representative of the for a light beam positioned so that the light beam is interrupted a plurality of times during each revolution of said rotor for the generation of pulses representative of the speed of revolution of the rotor, said light beam being oriented to pass close to the rotor axis, and the rotor having a polygonal aperture formed in the vicinity of its axis through which the light beam passes, so that upon rotation of the rotor the parts of the rotor located in radially spaced relationship to the axis thereof always interrupt the light beam, and means for sensing the light beam; and a counter-bearing having radial sheet members for connecting said counter-bearing to a wall of said housing, the rotor having a central shaft whose upstream end is journalled in a cavity in the downstream end face of said insert, and whose downstream end is journalled in a cavity in said counter-bearing, said counter-bearing comprising a central portion containing said cavity, the rotor being journalled with limited axial clearance.

2. A fluid flow rate meter according to claim 1, wherein said emitter for a light beam emits an infrared light beam.

3. A fluid flow rate meter comprising a housing to be mounted in a conduit, said housing having an axial passageway, a liquid directing member in the form of an insert filling up the passageway opening, said insert having at least one helical channel along its circumference, a rotor journalled on the downstream side of said insert, said rotor having an axis of rotation oriented in the direction of the axis of said passageway, and vane members extending in spaced parallel position to the axis of the rotor and comprising means for sensing rotor revolutions and for converting these into a signal representative of the fluid flow rate, the rotor having a central shaft whose upstream end is journalled in a cavity in the downstream end face of said insert, and whose downstream end is journalled in a cavity in a counter-bearing, said counter-bearing comprising a central portion containing said cavity and being connected through radial sheet members to the wall of said passageway, the rotor being journalled with limited axial clearance, the insert being provided with two helical circumferential channels, each extending at a steep angle to the axis for approximately 180° and beginning and terminating diametrically opposite each other, the counter-bearing being formed as a flat strip extending transversely through the fluid passageway.

4. A fluid flow rate meter as claimed in claim 3, characterized in that the rotor consists of a flat body with stub shafts extending on opposite ends thereof, said flat body having a central aperture therein for allowing the passage of light.

5. A fluid flow rate meter as claimed in claim 3, wherein said means for sensing rotor revolutions and for converting sensed revolutions into a signal representative of the fluid flow rate comprises an emitter for a light beam positioned so that the light beam is interrupted at least one time during each revolution of said rotor, and means for sensing the light beam; wherein the rotor has an aperture in the vicinity of its axis; and wherein said light beam is oriented to pass through the aperture of said rotor so that said light beam is interrupted a plurality of times per revolution of the rotor for the generation of pulses whereby upon rotation of the rotor the parts of the rotor located in radially spaced relationship to the axis thereof interrupt the light beam.

6. A fluid flow rate meter according to claim 1 or 5, characterized in that the aperture present within the rotor is open to the downstream end of said rotor.

7. A fluid flow rate meter as claimed in claim 3, characterized in that, for sensing the rotor revolutions, use is made of infrared apparatus.

8. A fluid flow rate meter as claimed in claim 1 or 3, characterized in that the greatest radial dimension of the rotor is only slightly smaller than the corresponding dimension of the fluid passageway.

9. A fluid flow rate meter as claimed in claim 1 or 3, characterized in that the meter is a fuel consumption meter for an internal combustion engine.

10. A fluid flow rate meter comprising a housing having an axial passageway therein and a stop shoulder protruding inwardly from a wall of said passageway, a fluid directing member in the form of an insert having two helical circumferential channels therein positioned in said passageway in contact with said stop shoulder, each channel extending for approximately 180° and beginning and terminating diametrically opposite the other channel, a counter-bearing provided in said passageway downstream of said insert in the form of a plate extending transversely through said fluid passageway, and oriented approximately transversely to a line connecting terminal ends of said channels, facing end faces of said insert and said plate having bearing cavities formed therein for journalling, with axial clearance, a shaft of a rotor, a rotor having a shaft journalled in said cavities and a body extending transversely to said shaft, and from which rod elements extend in the downstream direction in spaced relationship to said shaft, and the meter further comprising an infrared transmitter and an infrared receiver disposed in opposition to each other, said transmitter being arranged to direct a light beam to said receiver so that when the rotor rotates the light beam is periodically interrupted by said rod elements.

11. A meter according to claim 10, wherein said rod elements have a round cross-sectional configuration.

12. A meter according to claim 10, wherein said rod elements have a half-round cross-sectional configuration.

13. A fluid flow rate meter comprising:
a housing to be mounted in a conduit, said housing having an axial passageway;
a liquid directing member in the form of an insert filling up the passageway opening, said insert having at least one helical channel along its circumference;
a rotor formed as a flat body having stub shafts extending from opposite ends thereof journalled on the downstream side of said insert, said rotor having an axis of rotation oriented in the direction of the axis of said passageway and a central aperture provided in a central portion thereof for passage of light, and vane members extending in spaced parallel position to the axis of the rotor;
means for sensing rotor revolutions and for converting sensed revolutions into a signal representative of the fluid flow rate, said means for sensing comprising an emitter for a light beam positioned so that the light beam passes through the central aperture in said rotor and is interrupted at least one time during each revolution of said rotor, and means for sensing the light beam; and a counter-bearing having radial sheet members for connecting said counter-bearing to a wall of said housing, an upstream one of the stub shafts of the rotor being journalled in a cavity in the downstream end face of said insert, and the downstream one of the stub shafts being journalled in a cavity in said counter-bearing, said counter-bearing comprising a central portion containing said cavity, the rotor being journalled with limited axial clearance.

14. A fluid flow rate meter comprising:

a housing to be mounted in a conduit, said housing having an axial passageway;

a liquid directing member in the form of an insert filling up the passageway opening, said insert having at least one helical channel along its circumference;

a rotor journalled on the downstream side of said insert and having a rotor body extending transversely to a central shaft, and from which circumferentially spaced cantilever rod elements extend in the downstream direction in spaced relationship to said shaft, said rotor having an axis of rotation oriented in the direction of the axis of said passageway;

means for sensing rotor revolutions and for converting sensed revolutions into a signal representative of the fluid flow rate, said means for sensing comprising an emitter for a light beam positioned so that the light beam is interrupted by said rod elements during revolution of said rotor, and means for sensing the light beam to thereby obtain a signal representative of the fluid flow rate; and a counter-bearing having radical sheet members for connecting said counter-bearing to a wall of said housing, the rotor having a central shaft whose upstream end is journalled in a cavity in the downstream end face of said insert, and whose downstream end is journalled in a cavity in said counter-bearing, said counter-bearing comprising a central portion containing said cavity, the rotor being journalled with limited axial clearance.

* * * * *